United States Patent
Hamada

(10) Patent No.: US 9,825,999 B2
(45) Date of Patent: Nov. 21, 2017

(54) PLAYBACK CONTROL DEVICE, PLAYBACK CONTROL SYSTEM, AND STORAGE MEDIUM

(71) Applicant: Yuuta Hamada, Tokyo (JP)

(72) Inventor: Yuuta Hamada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 44 days.

(21) Appl. No.: 14/191,761

(22) Filed: Feb. 27, 2014

(65) Prior Publication Data

US 2014/0258548 A1 Sep. 11, 2014

(30) Foreign Application Priority Data

Mar. 11, 2013 (JP) ................. 2013-048357

(51) Int. Cl.
*H04L 29/06* (2006.01)
(52) U.S. Cl.
CPC ...... *H04L 65/1069* (2013.01); *H04L 65/4038* (2013.01); *H04L 65/80* (2013.01)
(58) Field of Classification Search
CPC ............. H04L 65/1069; H04L 65/4038; H04L 65/80; H04L 12/1831
See application file for complete search history.

(56) References Cited

U.S. PATENT DOCUMENTS 6,529,602 B1 * 3/2003 Walker .................... H04K 1/00
379/67.1
7,466,334 B1 * 12/2008 Baba ..................... G11B 27/034
348/14.06
8,203,592 B2 * 6/2012 Nelson ..................... H04N 7/15
348/14.01

(Continued)

FOREIGN PATENT DOCUMENTS

| JP | 2002-251393 | 9/2002 |
| JP | 2007-323420 A | 12/2007 |

(Continued)

OTHER PUBLICATIONS

Japanese Office Action dated May 16, 2017 in Japanese Application No. 2013-048357 (2 pages).

*Primary Examiner* — Arvin Eskandarnia
(74) *Attorney, Agent, or Firm* — Oblon, McClelland, Maier & Neustadt, L.L.P.

(57) ABSTRACT

A playback control device includes an identification part configured to identify one of communication terminals based on identification data associated with a request to play session data including at least one of image data and sound data; a first acquisition part configured to acquire session data which has been communicated in a session in which the communication terminals have joined; a second acquisition part configured to acquire, in response to the identification data, time data representing at least a time period in which the identified communication terminal had joined the session; and a control part configured to, in response to the time data, allow playing of the session data for the time period in which the identified communication terminal had joined the session and disallow playing of the session data for the time period in which the identified communication terminal had not joined the session.

12 Claims, 16 Drawing Sheets

(56) References Cited

U.S. PATENT DOCUMENTS

| | | | | |
|---|---|---|---|---|
| 8,902,274 | B2* | 12/2014 | Malegaonkar | H04N 7/147 340/573.1 |
| 2008/0120371 | A1* | 5/2008 | Gopal | H04L 12/1831 709/204 |
| 2010/0053302 | A1* | 3/2010 | Ivashin | H04N 7/147 348/14.08 |
| 2010/0185733 | A1* | 7/2010 | Hon | G06F 17/30029 709/205 |
| 2012/0128322 | A1* | 5/2012 | Shaffer | H04N 9/8205 386/241 |
| 2012/0221715 | A1 | 8/2012 | Hamada | |
| 2013/0222526 | A1* | 8/2013 | Miyazawa | H04N 7/155 348/14.08 |

FOREIGN PATENT DOCUMENTS

| | | |
|---|---|---|
| JP | 2010-224915 | 10/2010 |
| JP | 2012-156759 | 8/2012 |
| JP | 2012-195925 | 10/2012 |

\* cited by examiner

FIG.5

| COMMUNI-CATION TYPE | SOURCE TERMINAL ID | DESTI-NATION TERMINAL ID | SESSION ID | CONFER-ENCE ID | CONFER-ENCE SESSION ID | COMMUNICATION DATE AND TIME |
|---|---|---|---|---|---|---|
| online | 110001 | – | se001 | – | – | 2010-09-01 09:30:00 |
| online | 110002 | – | se002 | – | – | 2010-09-01 09:30:00 |
| online | 110003 | – | se003 | – | – | 2010-09-01 09:30:00 |
| invite | 110001 | 110002 | – | conf001 | – | 2010-09-01 09:59:50 |
| accept | 110002 | 110001 | – | conf001 | – | 2010-09-01 09:59:59 |
| start | 110001 | – | – | conf001 | – | 2010-09-01-10:00:00 |
| join | 110001 | – | – | conf001 | cse001 | 2010-09-01 10:00:00 |
| join | 110002 | – | – | conf001 | cse002 | 2010-09-01 10:00:00 |
| call | 110003 | 110001 | – | conf001 | – | 2010-09-01 10:09:50 |
| accept | 110001 | 110003 | – | conf001 | – | 2010-09-01 10:09:59 |
| join | 110003 | – | – | conf001 | cse003 | 2010-09-01 10:10:00 |
| leave | 110002 | – | – | conf001 | cse002 | 2010-09-01 10:40:00 |
| offline | 110003 | – | se003 | conf001 | cse003 | 2010-09-01 11:30:25 |
| leave | 110001 | – | – | conf001 | cse001 | 2010-09-01 11:30:25 |
| end | 110001 | – | – | conf001 | – | 2010-09-01 11:30:25 |
| offline | 110001 | – | se001 | – | – | 2010-09-01 11:35:00 |
| offline | 110002 | – | se002 | – | – | 2010-09-01 11:40:00 |
| ... | ... | ... | ... | ... | ... | ... |
| online | 110005 | – | se005 | – | – | 2010-09-12 14:20:00 |
| online | 110006 | – | se006 | – | – | 2010-09-12 14:21:00 |
| invite | 110005 | 110006 | – | conf002 | – | 2010-09-12 14:29:50 |
| accept | 110006 | 110005 | – | conf002 | – | 2010-09-12 14:29:55 |
| start | 110005 | – | – | conf002 | – | 2010-09-12 14:30:00 |
| join | 110005 | – | – | conf002 | cse005 | 2010-09-12 14:30:00 |
| ... | ... | ... | ... | ... | ... | ... |

| LOG DATA |
|---|
| {"COMMUNICATION TYPE":"online", "SOURCE TERMINAL ID":"110001", "SESSION ID":"se001", "COMMUNICATION DATE AND TIME":"2010-09-01 09:30:00"} |
| {"COMMUNICATION TYPE":"online", "SOURCE TERMINAL ID":"110002", "SESSION ID":"se002", "COMMUNICATION DATE AND TIME":"2010-09-01 09:30:00"} |
| {"COMMUNICATION TYPE":"online", "SOURCE TERMINAL ID":"110003", "SESSION ID":"se003", "COMMUNICATION DATE AND TIME":"2010-09-01 09:30:00"} |
| {"COMMUNICATION TYPE":"invite", "SOURCE TERMINAL ID":"110001", "DESTINATION TERMINAL ID":"110002", "CONFERENCE ID":"conf001", "COMMUNICATION DATE AND TIME":"2010-09-01 09:59:50"} |
| {"COMMUNICATION TYPE":"accept", "SOURCE TERMINAL ID":"110002", "DESTINATION TERMINAL ID":"110001", "CONFERENCE ID":"conf001", "COMMUNICATION DATE AND TIME":"2010-09-01 09:59:59"} |
| ... |

FIG.7

| HISTORY ID | TERMINAL ID | CONFERENCE ID | CONFERENCE SESSION ID | JOIN DATE AND TIME | LEAVE DATE AND TIME | HOURS OF PARTICIPATION | LEAVE STATUS |
|---|---|---|---|---|---|---|---|
| 001 | 110001 | conf001 | cse001 | 2010-09-01 10:10:00 | 2010-09-01 11:10:25 | 01:00:25 | LEFT |
| 002 | 110002 | conf001 | cse002 | 2010-09-01 10:00:00 | 2010-09-01 10:40:00 | 00:40:00 | LEFT |
| 003 | 110003 | conf001 | cse003 | 2010-09-01 10:10:00 | 2010-09-01 11:30:25 | 01:20:25 | FORCE-QUIT |
| 004 | 110005 | conf002 | cse005 | 2010-09-12 14:30:00 | - | - | ONGOING |
| ... | ... | ... | ... | ... | ... | ... | ... |

| CONFERENCE ID | HOST TERMINAL ID | START DATE AND TIME | END DATE AND TIME | DURATION |
|---|---|---|---|---|
| conf001 | 110001 | 2010-09-01 10:00:00 | 2010-09-01 11:30:25 | 01:30:25 |
| conf002 | 110005 | 2010-09-12 14:30:00 | - | - |
| ... | ... | ... | ... | ... |

| CONFERENCE ID | VIDEO DATA |
|---|---|
| conf001 | xxx.mp4 |
| conf002 | xxx.mp4 |
| ... | ... |

CONFIGURATION UTILITY 1001

TERMINAL ID: 110001     HELP LOGOUT

MAIN MENU > CONFERENCE HISTORY

ATTENDEE HISTORY (SEPTEMBER, 2010)

SEPTEMBER, 2010 ▼   1002

| CONFER-ENCE ID | START DATE AND TIME | END DATE AND TIME | JOIN DATE AND TIME | LEAVE DATE AND TIME | HOURS OF PARTICI-PATION | LEAVE STATUS | CONFERENCE VIDEO |
|---|---|---|---|---|---|---|---|
| conf001 | 2010-09-01 10:00:00 | 2010-09-01 11:30:25 | 2010-09-01 10:10:00 | 2010-09-01 11:10:25 | 01:00:25 | LEFT | PLAY |
| conf004 | 2010-09-02 16:00:00 | 2010-09-02 17:00:00 | 2010-09-02 15:10:00 | 2010-09-02 15:30:40 | 00:20:40 | LEFT | PLAY |
| conf005 | 2010-09-05 13:00:00 | 2010-09-05 14:00:00 | 2010-09-05 13:00:00 | 2010-09-05 14:00:00 | 01:00:00 | FORCE-QUIT | PLAY |
| conf006 | 2010-09-12 18:00:00 | 2010-09-12 20:31:02 | 2010-09-12 18:01:10 | 2010-09-12 20:30:45 | 02:29:35 | LEFT | PLAY |

CONFIGURATION UTILITY
1500

TERMINAL ID: 110001 — 1502     HELP LOGOUT

MAIN MENU > CONFERENCE HISTORY

ATTENDEE HISTORY (SEPTEMBER, 2010)

◀ SEPTEMBER, 2010 ▶

▲ 1501 ▼

| CONFER-ENCE ID | START DATE AND TIME | END DATE AND TIME | JOIN DATE AND TIME | LEAVE DATE AND TIME | HOURS OF PARTICI-PATION | LEAVE STATUS | HOST TERMINAL ID | CONFERENCE VIDEO |
|---|---|---|---|---|---|---|---|---|
| conf001 | 2010-09-01 10:00:00 | 2010-09-01 11:30:25 | 2010-09-01 10:10:00 | 2010-09-01 11:10:25 | 01:00:25 | LEFT | 110001 | PLAY |
| conf004 | 2010-09-02 16:00:00 | 2010-09-02 17:00:00 | 2010-09-02 15:10:00 | 2010-09-02 15:30:40 | 00:20:40 | LEFT | 110003 | PLAY |
| conf005 | 2010-09-05 13:00:00 | 2010-09-05 14:00:00 | 2010-09-05 13:00:00 | 2010-09-05 14:00:00 | 01:00:00 | FORCE-QUIT | 110002 | PLAY |
| conf006 | 2010-09-12 18:00:00 | 2010-09-12 20:31:02 | 2010-09-12 18:01:10 | 2010-09-12 20:30:45 | 02:29:35 | LEFT | 110005 | PLAY |

FIG.16

| CONFERENCE ID | HOST TERMINAL ID | START DATE AND TIME | END DATE AND TIME | DURATION | PRIVATE CODE |
|---|---|---|---|---|---|
| conf001 | 110001 | 2010-09-01 10:00:00 | 2010-09-01 11:30:25 | 01:30:25 | xxxxxxx xxxxxxx |
| conf002 | 110005 | 2010-09-12 14:30:00 | – | – | yyyyyyy yyyyyyy |
| ... | ... | ... | ... | ... | ... |

503c-2

PLAYBACK CONTROL DEVICE, PLAYBACK CONTROL SYSTEM, AND STORAGE MEDIUM

BACKGROUND OF THE INVENTION

1. Field of the Invention

An aspect of this disclosure is related to a playback control device, playback control system, and a storage medium.

2. Description of the Related Art

In these days, a communication management system (e.g. a conference system) has been popular, which communicates video data such as image data and sound data between a plurality of communication terminals via a communication network such as the Internet. In addition, widespread broadband environments enable the communication management system to transmit and receive high quality image and sound data. Thus, the communication management system helps a user to understand the condition of another party in a remote conference, and they may participate in the remote conference as if they were in the same room.

It is also known that such a communication management system stores the video data (e.g. recorded video) pertaining to the communication between the communication terminals and manages the video data to make it viewable.

Patent Document 1 shows a method to register allowed users who may play recorded video of conference to conference data when the conference is reserved; and to play the recorded video in response to a request from one of the allowed users having been registered to access the conference data.

However, the conventional communication management system has a disadvantage whereas easily managing the playback control of each communication terminal for the recorded video of a multipoint conference. That may cause a security issue concerning a reference range of the recorded video.

For example, when managers in branch offices report for a central office in a general meeting hosted by the central office using the communication management system, employees of respective branch offices have to be allowed to playback a part of the recorded video relating to their boss's report. In addition, when a conference between three or more different companies is recorded, a part of the record in which two companies have a discussion must not be provided to the other companies.

However, in the conventional method it is not possible to play only a part of the recorded video of the conference in which a certain user (a terminal) joins the conference. In addition, a reservation for joining the conference is expected in this method. A user has to configure the allowed users in advance which may playback the recorded video. Thus, it is not easy to manage the playback. Furthermore, it is difficult for this method to manage the playback when users (communication terminals) can freely join and leave an ongoing conference.

SUMMARY OF THE INVENTION

In one aspect, the present disclosure provides a playback control device, a playback control system, and a storage medium which substantially eliminates one or more problems caused by the limitations and disadvantages of the related art.

In an aspect of this disclosure, there is provided a playback control device including an identification part configured to identify one of communication terminals based on identification data associated with a request to play session data including at least one of image data and sound data; a first acquisition part configured to acquire session data which has been communicated in a session in which the communication terminals have joined; a second acquisition part configured to acquire, in response to the identification data, time data representing at least a time period in which the identified communication terminal has joined the session; and a control part configured to, in response to the time data, allow playing of the session data for the time period in which the identified communication terminal had joined the session and to disallow playing of the session data for the time period in which the identified communication terminal had not joined the session.

According to another embodiment of this invention, there is provided a playback control system including a plurality of communication terminals; a management device configured to manage a session in which the communication terminals join; and a playback control device configured to manage playback of session data which has been communicated in the session, the session data including at least one of image data and sound data; wherein the playback control device includes an identification part configured to identify one of the communication terminals based on identification data associated with a request to play the session data; a first acquisition part configured to acquire the session data; a second acquisition part configured to acquire, in response to the identification data, time data representing at least a time period in which the identified communication terminal had joined the session; and a control part configured to, in response to the time data, allow playing of the session data for the time period in which the identified communication terminal had joined the session and to disallow playing of the session data for the time period in which the identified communication terminal had not joined the session.

According to another embodiment of this invention, there is provided a computer-readable storage medium for storing a program therein, the program causing a computer to perform a method including identifying one of communication terminals based on identification data associated with a request to play session data including at least one of image data and sound data; acquiring session data which has been communicated in a session in which the communication terminals have joined; acquiring, in response to the identification data, time data representing at least a time period in which the identified communication terminal had joined the session; and in response to the time data, allowing playing of the session data for the time period in which the identified communication terminal had joined the session and disallowing playing of the session data for the time period in which the identified communication terminal had not joined the session.

BRIEF DESCRIPTION OF THE DRAWINGS

Other objects and further features of embodiments may become apparent from the following detailed description when read in conjunction with the accompanying drawings, in which:

FIG. 5 is a table illustrating exemplary log data according to an embodiment of this invention;

FIG. 6 is a table illustrating the exemplary log data in JSON style according to an embodiment of this invention;

FIG. 7 is a table illustrating an example of an attendee management table;

FIG. 8 is a table illustrating an example of an conference management table;

FIG. 9 is a table illustrating an example of a video data management table;

FIG. 10 is a drawing illustrating an exemplary operation screen to play recorded videos;

FIG. 15 is a drawing illustrating an exemplary operation screen to play recorded video data;

FIG. 16 is a table illustrating another example of a conference management table.

DESCRIPTION OF THE PREFERRED EMBODIMENTS

Figure 1:
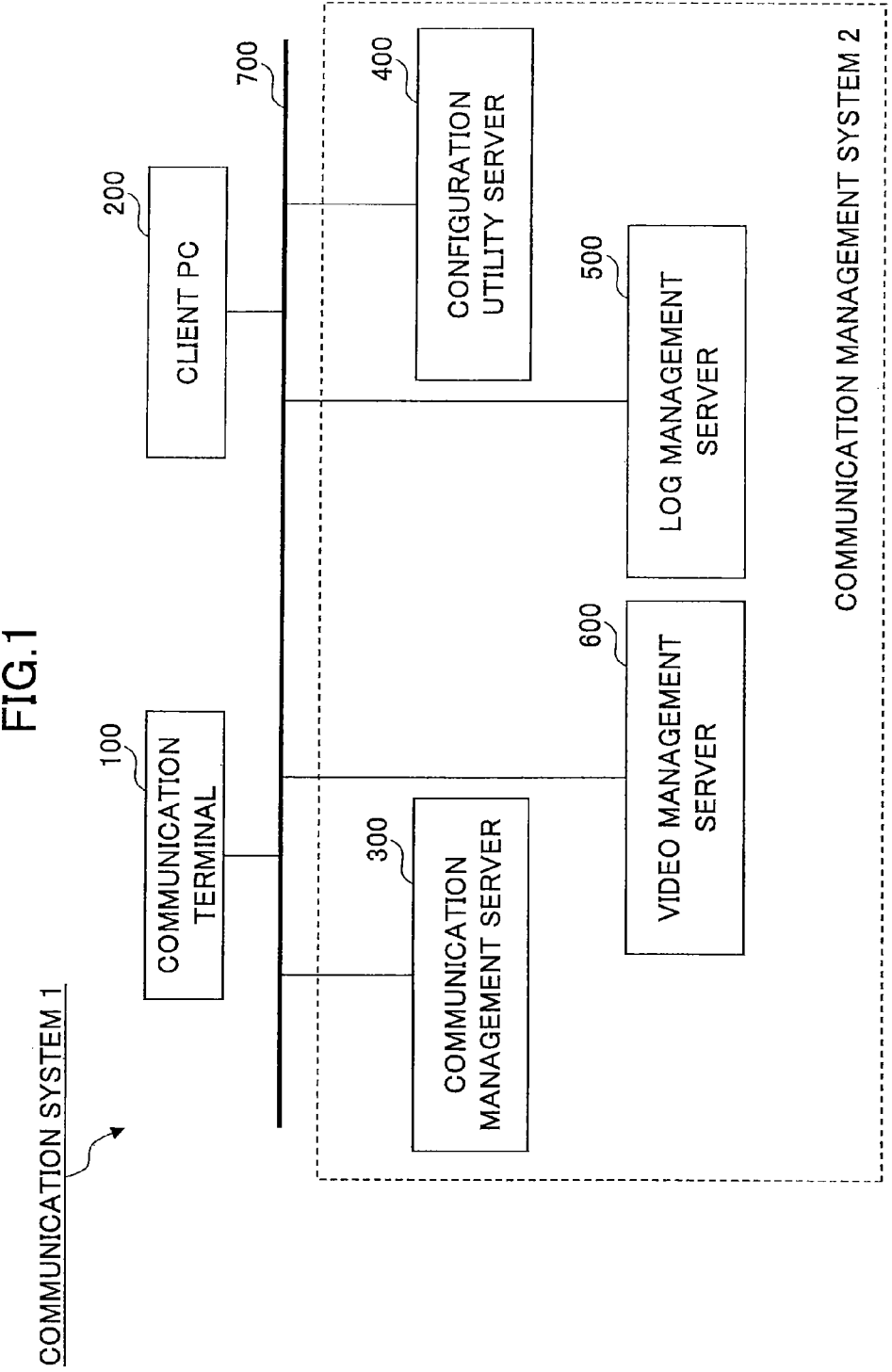
FIG. 1 is a drawing illustrating an overview of a communication system according to an embodiment of this invention.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

[System]
<Configuration Overview>
Prior to explanation of specific elements of an embodiment of this invention, a configuration overview is explained to practice the embodiment.

FIG. 1 is a drawing illustrating an overview of a communication system 1 according to an embodiment of this invention. The communication system 1 has a communication terminal 100, a client PC 200, a communication management server 300, a configuration utility server 400, a log management server 500, and a video management server 600, which are connected mutually via a network 700.

The communication system 1 includes a data delivery system transmitting content data from the communication terminal 100 to another communication terminal 100 in a single direction via a transmission management system 2 (e.g. the communication management server 300, the configuration utility server 400, the log management server 500, and the video management server 600 as shown in FIG. 1) or a communication system transferring video data and sound data between the communication terminals 100 bi-directionally. An example of the communication system is a video conference system or a video telephony system.

The communication terminal 100 may transmit and receive video data (i.e. including video data, still image data, and sound data) which is an example of content data communicated with another communication terminal. That enables the communication terminal 100 to execute the video conference. Here, one or more communication terminals 100 may exist.

The client PC 200 is a PC for accessing the configuration utility server 400 to playback recorded video data.

The communication management server 300 may handle communications between the communication terminals 100 by controlling or managing the communications between the communication terminals 100 and creating log data of the communications. The communication terminal 100 may perform the video conference by transmitting and receiving the video data mutually via the communication management server 300.

The configuration utility server 400 may accept configurations for the communication terminal 100 from the client PC 200. In addition, the configuration utility server 400 may show a history of the recorded conferences and may control playback of the recorded videos.

The log management server 500 may manage the log data of the communications between the communication terminal 100. For example, the log management server 500 may receive the log data from the communication management server 300. The log management server 500 may provide the modified log data (e.g. a list of conference histories) in response to a request from the configuration utility server 400.

The video management server 600 may record and manage the video data communicated between the communication terminal 100. For example, the video management server 600 may receive and record the video data from the communication management server 300. In addition, the video management server 600 may provide the recorded video data in response to a request from the configuration utility server 400.

The network 700 is a communication network including a local area network (LAN) or a wide area network (WAN). The WAN may include a public line.

In this embodiment, the log management server 500 receives the log data via the communication management server 300. However, The communication terminal 100 may transmit a communication log to the management server 500 directly. In addition, the video management server 600 may acquire the mutual video data communicated directly between the communication terminals 100.

In this embodiment, the communication management server 300, the log management server 500, the video management server 600, and the configuration utility server 400 are illustrated separately. However, they may be integrated into a single server working as the communication management server 300. In addition, any combination of the servers may be used.

Figure 2:
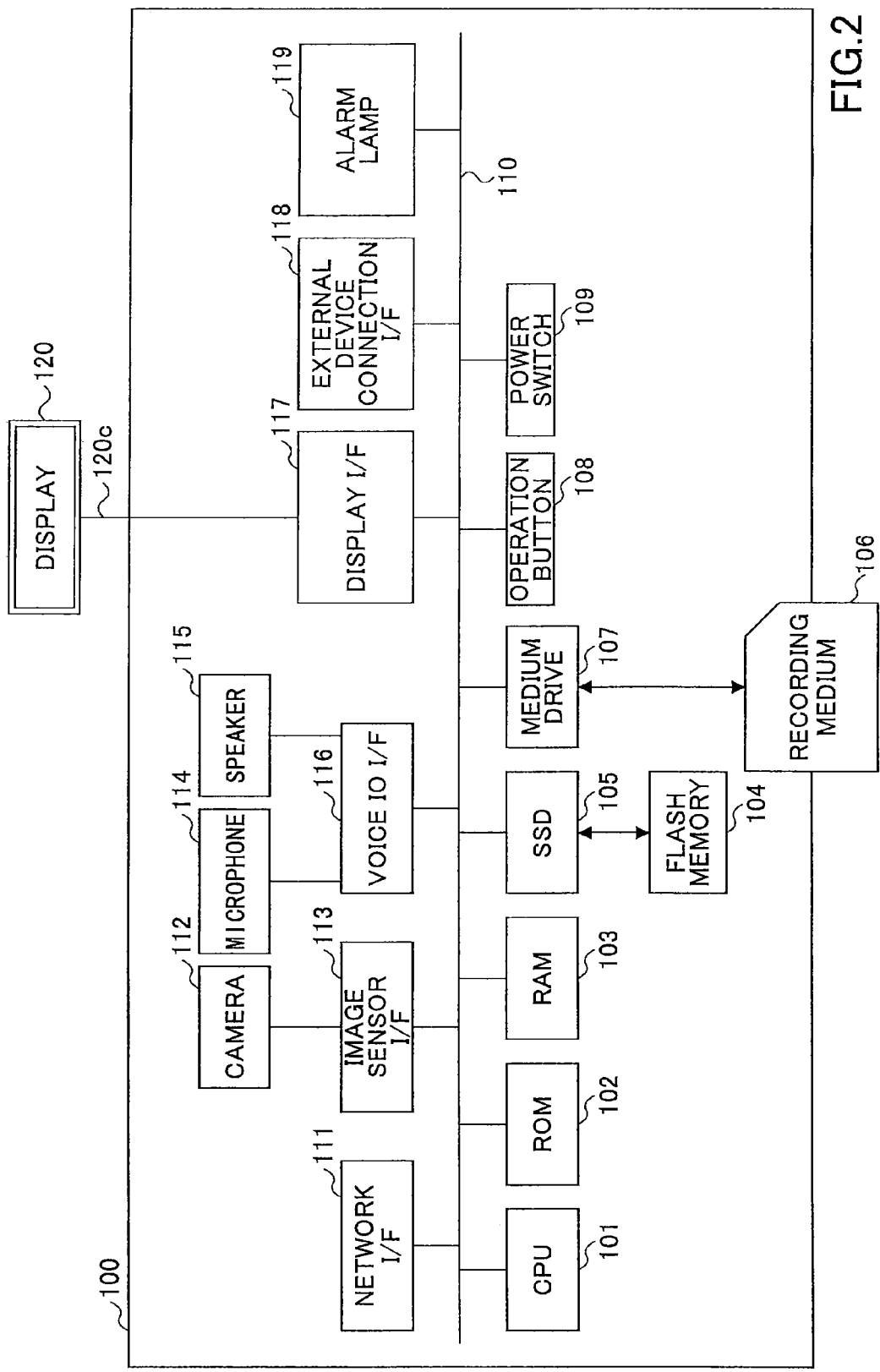
FIG. 2 is a block diagram illustrating an exemplary hardware configuration of a communication terminal according to an embodiment of this invention.

<Hardware Configuration>
(Communication Terminal 100)
FIG. 2 is a block diagram illustrating an exemplary hardware configuration of a communication terminal according to this embodiment. The communication terminal 100 according to this embodiment has a central processing unit (CPU) 101, a read-only memory (ROM) 102, a random access memory (RAM) 103, a flash memory 104, a solid state drive 105, a medium drive 107, an operation button 108, a power switch 109, a bus line 110, and a network interface (I/F) 111. The CPU 101 may control the communication terminal 100. The ROM 102 may store programs such as an initial program loader (IPL), etc. performed by the CPU 101. The RAM 103 may provide a work area for the CPU 101. The flash memory 104 may store programs including a terminal program and some kinds of data such as image and sound data. The SSD 105 may read/write data from/to the flash memory 104 according to an instruction from the CPU 101. The medium drive 107 may read/write data from/to the recording medium 106 such as a flash memory. The operation button 108 may accept an input from a user to choose the communication terminal 100 as a destination terminal. The power switch 109 may toggle the power of the communication terminal 100. The network I/F 111 may transfer data using the network 700.

In addition, the communication terminal 100 has an internal camera 112, an image sensor I/F 113, a microphone 114, an (internal) speaker 115, a voice I/F 116, a display I/F 117, an external device connection I/F 118, an alarm lamp 119, and an (external) display 120. The internal camera 112 may obtain image data by taking an image of a target according to an instruction from the CPU 101. The image sensor I/F 113 may control operations of the camera 112. The microphone 114 may obtain sound data by collecting a user's voice. The internal speaker 115 may output sound. The voice I/F 116 may control input/output of sound signals between the microphone 114 and the speaker 115 according to an instruction from the CPU 101. The display I/F 117 may transfer image data to the external display 120 according to an instruction from the CPU 101. The external device connection I/F 118 may be used to connect various external devices. The alarm lamp 119 may give an alarm when a problem of the functionality of the communication terminal 100 occurs. The bus line 110 includes an address bus and a data bus which may electrically connect the above-mentioned parts to each other.

The display 120 is a display part to display an image of the target and operation icons. The display 120 may be a crystal liquid display or an organic light emitting display. In addition, the display 120 is connected to the display I/F 117 with a cable 120c. The cable 120c may be an analog RGB (VGA) cable, a component video cable, a high-definition multimedia interface (HDMI) cable, or a digital video interactive (DVI) cable.

The camera 112 includes a lens and a solid-state image sensing device to convert light into electric charges for generating an image (a video) of the target. A complementary metal oxide semiconductor (CMOS) or a charge coupled device (CCD) is used to implement the solid-state image sensing device.

The external device connection I/F 118 may be used to connect external devices such as an external camera, an external microphone, and an external speaker with a universal serial bus (USB) cable inserted into a connecting port of the chassis. When the external camera is connected, the external camera works according to an instruction of the CPU 101 in priority to the internal camera 112. When the external microphone or the external speaker is connected, each of them works according to an instruction of the CPU 101 with priority over the internal microphone 114 or the internal speaker 115.

The recording medium 106 is removable from the communication terminal 100. Alternatively, a non-volatile memory such as an electrically erasable and programmable ROM (EEPROM) may be used to read/write data according to an instruction from the CPU 101.

The hardware configuration shown in FIG. 2 is just an example. For example, the camera 112 and the microphone 114 may not be embedded but attached externally. In addition, the communication terminal 100 may be a cell phone, a smart phone, a tablet, or a general-purpose personal computer (PC).

The client PC 200 also has the same hardware configuration with the communication terminal 100. Thus, the explanation is not provided here.

(Communication Management Server 300)

Figure 3:
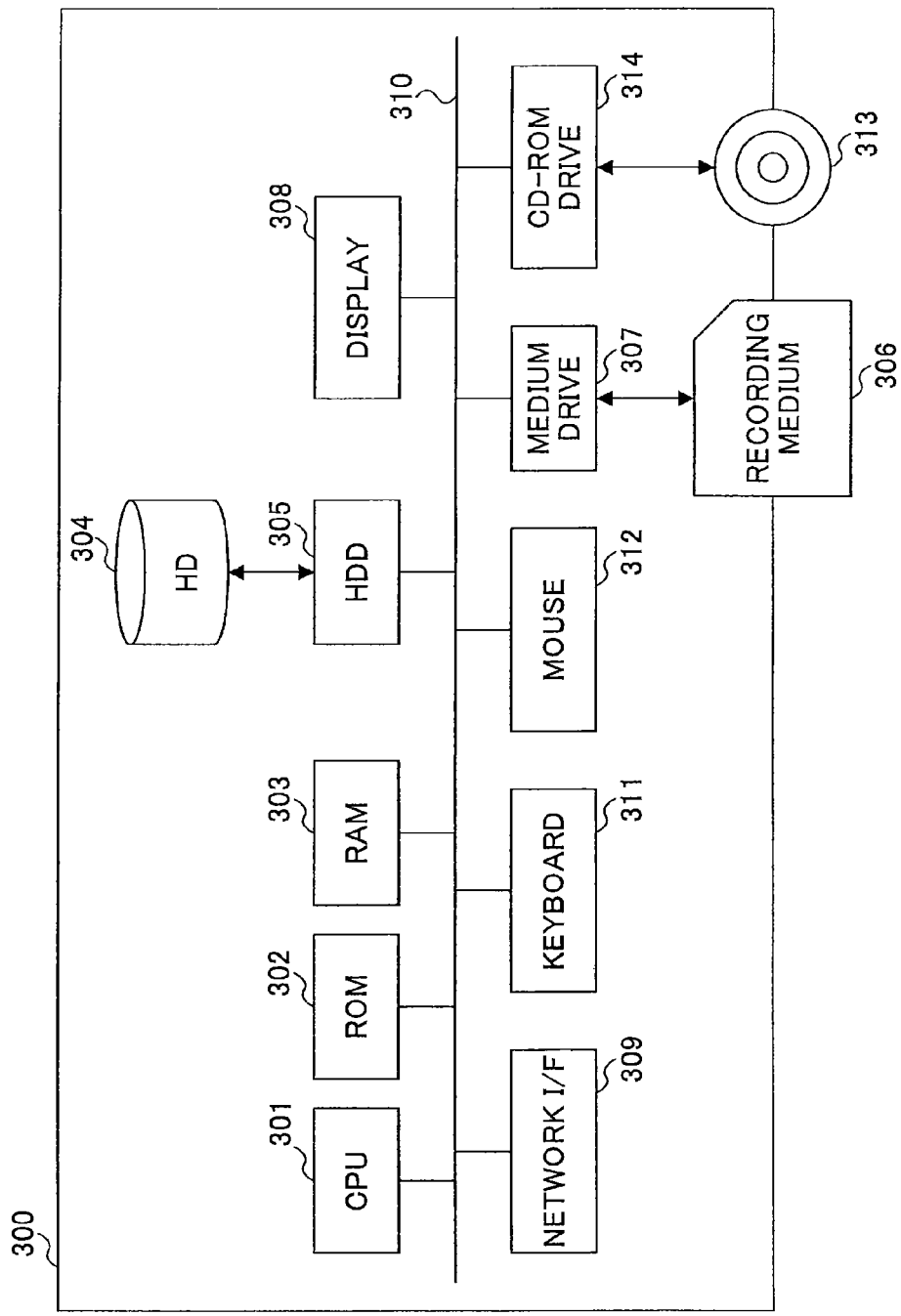
FIG. 3 is a block diagram illustrating an exemplary hardware configuration of a communication management server according to an embodiment of this invention.

FIG. 3 is a block diagram illustrating an exemplary hardware configuration of a communication management server according to this embodiment. The communication management server 300 has a CPU 301, a ROM 302, a RAM 303, a HD 304, a hard disk drive (HDD) 305, a medium drive 307, a display 308, a network I/F 309, a bus line 310, a keyboard 311, a mouse 312, and a CD-ROM drive 314. The CPU 101 may control the communication management server 300. The ROM 302 may store programs such as an IPL, etc. performed by the CPU 301. The RAM 303 may provide a work area for the CPU 301. The HD 304 may store programs including a communication management program and some kinds of data. The HDD 305 may read/write data from/to the HD 304 according to an instruction from the CPU 301. The medium drive 307 may read/write data from/to a recording medium 306 such as a flash memory. The display 308 may show various kinds of information such as a cursor, a menu, a window, characters or images. The network I/F 309 may transfer data using the network 700. The keyboard 311 has keys to accept user inputs of characters, numbers, and other instructions. The mouse 312 may accept user input including a click and a cursor movement to choose an instruction or a target. The CD-ROM drive 314 may read/write data from/to a CD-ROM which is an example of a removable recording medium. The bus line 310 includes an address bus and a data bus which may electrically connect the above-mentioned parts to each other.

The configuration utility server 400, the log management server 500, and the video management server 600 have the same hardware configuration with the communication management server 300. Thus, the explanations are not provided here.

<Functions>

Next, a functional configuration of this embodiment is discussed.

Figure 4:
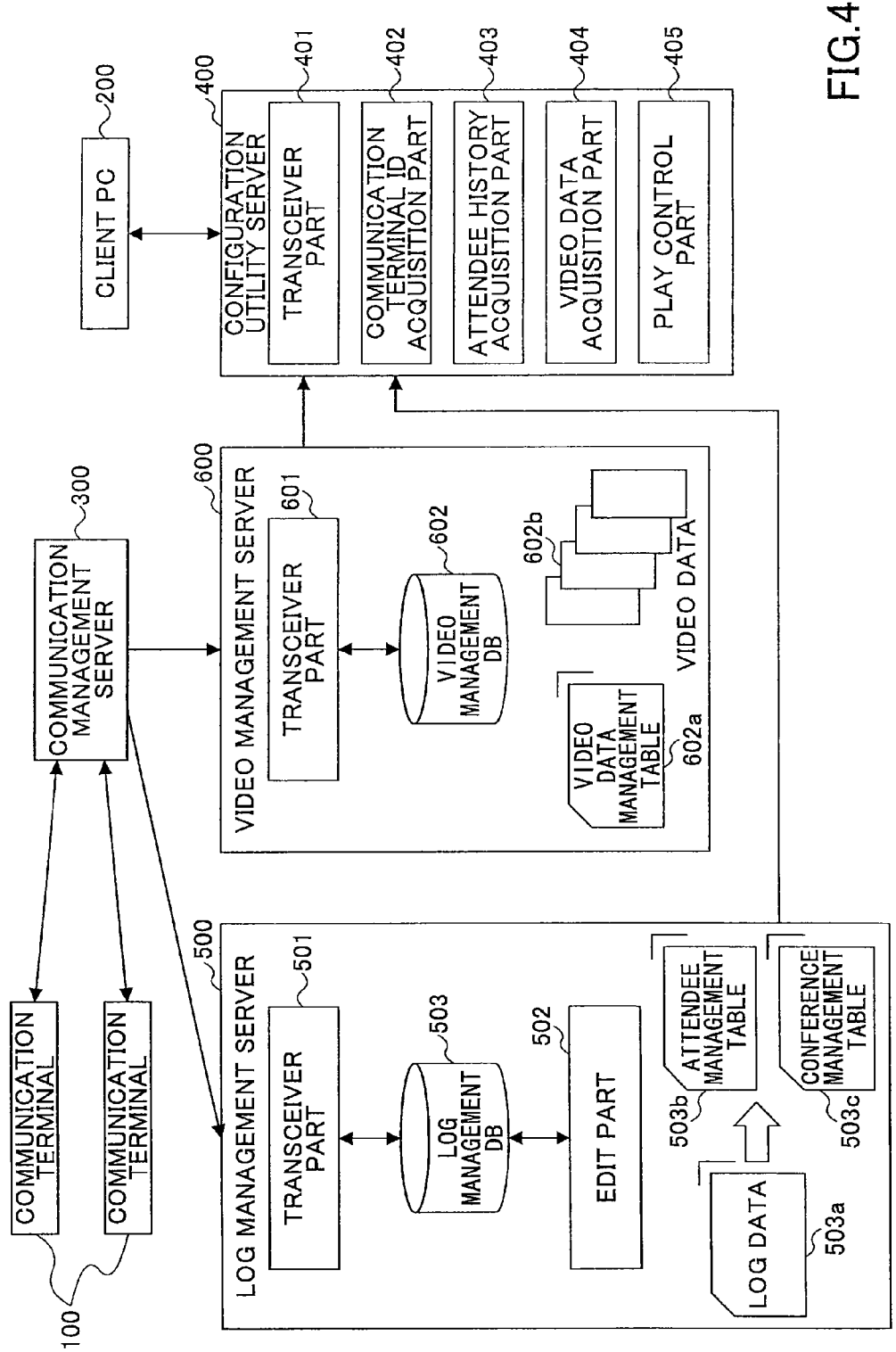
FIG. 4 is a block diagram illustrating exemplary functional configurations of a log management server 500, a video management server 600, and a configuration utility server 400 according to an embodiment of this invention.

FIG. 4 is a block diagram illustrating exemplary functional configurations of a log management server 500, a video management server 600, and a configuration utility server 400 according to an embodiment of this invention;

(Log Management Server)

The log management server 500 has a transceiver part 501, an edit part 502, and a log management database (DB) 503.

The transceiver part 501 may receive the log data for communications between the communication terminal 100 via the communication management server (or from the communication terminal 100 directly). In response to a request from the configuration utility server 400, the transceiver part 501 may transmit attendee history data obtained from the log management DB 503 to the configuration utility server 400. The transceiver part 501 may receive the log data periodically or at the time when new data is generated.

The edit part 502 may modify the received log data to extract the attendee history data and conference data. The attendee history data and the conference data are stored in an attendee management table 503b and a conference management table 503c in the log management DB 503.

The log management DB 503 has the attendee management table 503b and the conference management table 503. The attendee management table 503b stores the attendee history data (discussed later). The conference management table 503c stores the conference data (discussed later).

(Log Data)

FIG. 5 is a table illustrating exemplary log data according to this embodiment. As shown in FIG. 5, the log data 503a includes the following data items: "Communication Type", "Source Terminal ID", "Destination Terminal ID", "Session ID", "Conference ID", "Conference Session ID", and "Communication Date and Time".

The data item "Communication Type" represents the status of the communication conditions. In particular, a condition "Online" represents that the communication terminal 100 is powered on. A condition "Offline" represents that the communication terminal 100 is powered off (when the communication terminal 100 is disconnected or powered off incorrectly during a conference, the conference ID and the conference session ID are set). A condition "Invite" represents an invite request to the conference. A condition "Call" represents a request to join the ongoing conference. A condition "Accept" represents an acceptance to the request of invite or join. A condition "Start" represents the beginning of the conference. A condition "End" represents the end of the conference. A condition "Join" represents that the communication terminal 100 joins the conference. A condition "Leave" represents that the communication terminal 100 leaves the conference.

The item "Source Terminal ID" represents a unique ID to identify a source communication terminal.

The item "Destination Terminal ID" represents a unique ID to identify a destination communication terminal.

The item "Session ID" represents an ID to identify a session established from the period when the communication terminal becomes online to when it becomes offline.

The "Conference ID" represents an ID to identify a conference that the communication terminal 100 joined (i.e. a communication between the communication terminals 100). The ID is assigned to each conference when it is started.

The "Conference Session ID" represents an ID to identify a conference session used from the period when the communication terminal 100 joins to when it leaves. For example, when the communication terminal 100 repeatedly joins and leaves a single conference, the conference session ID varies depending on the join.

The "Communication Date and Time" represents the date and time when the communication terminal 100 performs the communication represented in the "Communication Type".

The ID used as the "Source Terminal ID" or the "Destination Terminal ID" identifies the communication terminal. The ID is assigned to the communication terminal or the user in advance.

The above-mentioned data items are just examples. Other data items or values may be included. In the above example, each data item (i.e. schema) is clearly defined such as a table for a database. However, since the log data may include various items, the log data may be expressed by JavaScript Object Notation (JSON) or the Extensible Markup Language (XML) style which includes only text-based data items. FIG. 6 is a table illustrating the exemplary log data in the JSON style according to this embodiment.

(Attendee Management Table)

FIG. 7 is a table illustrating an example of an attendee management table. As shown in FIG. 7, the attendee management table 503b stores the attendee history data. The attendee history data includes, for example, information about which communication terminal joins/leaves which conference and when. Thus, the attendee history data represents a history of attendees for a conference.

In particular, the attendee history data includes the following data items: "History ID", "Terminal ID", "Conference ID", "Conference Session ID", "Join Date and Time", "Leave Date and Time", "Hours of Participation", and "Leave Status".

The "History ID" represents an ID to identify a history data item.

The "Terminal ID" represents an ID to identify the communication terminal 100 which joined the conference. The ID corresponds to the "Source Terminal ID" and the "Destination Terminal ID" in the log data 503a.

The "Conference ID" represents an ID to identify the conference that the communication terminal 100 joined. The "Conference ID" is based on the "Conference ID" in the log data 503a.

The "Conference Session ID" represents an ID to identify a conference session used from when the communication terminal 100 joins to when it leaves. The ID corresponds to the "Conference Session ID" in the log data 503a.

The "Join Date and Time" represents date and time when the communication terminal 100 joined the conference. The "Join Data and Time" is based on the "Communication Date and Time" in the log data 503a.

The "Leave Date and Time" represents date and time when the communication terminal 100 left the conference. The "Leaving Data and Time" is based on the "Communication Date and Time" in the log data 503a.

The "Hours of Participation" represents duration of participating the conference. The "Hours of Participation" is based on the "Communication Date and Time" in the log data 503a.

The "Leave Status" represents a leaving condition for the conference. "Left" represents that the communication terminal 100 left the conference correctly. "Force-Quit" represents that the communication terminal 100 left incorrectly due to an unexpected shutdown. "Ongoing" represents that the communication terminal 100 is participating the conference. The "Leave Status" is based on the "Communication Type" and the "Communication Date and Time" in the log data 503a.

The attendee history data in the attendee management table 503b is created by the edit part 502 which edits the received log data.

For example, an operation history may be obtained from the "Source Terminal ID", the "Destination Terminal ID", and the "Communication Type" in the log data. From the "Conference ID", it may be determined which conference the communication terminal joined. From the "Communication Date and Time", the date and time when the operation was performed may be obtained. Japanese Laid-open Patent Publication No. 2012-195925 shows an edit process for the log data performed by the edit part 502.

(Conference Management Table)

FIG. 8 is a table illustrating an example of the conference management table. As shown in FIG. 8, the conference management table 503c stores the conference data. The conference data includes, for example, information about what kind of conference is held by whom and when. Thus, the conference data represents information about the held conference.

In particular, the conference data includes the following data items: "Conference ID", "Host Terminal ID", "Start Date and Time", "End Date and Time", and "Duration".

The "Conference ID" represents an ID to identify the conference that the communication terminal 100 joined. The "Conference ID" is based on the "Conference ID" in the log data 503a.

The "Host Terminal ID" represents an ID to identify the communication terminal 100 which hosted the conference. The "Host Terminal ID" is based on the "Source Terminal ID" and the "Destination Terminal ID" in the log data 503a.

The "Start Date and Time" represents date and time when the conference was started. The "Start Date and Time" is based on the "Communication Type", the "Conference ID", and the "Communication Date and Time" in the log data 503a.

The "End Date and Time" represents date and time when the conference was ended. The "End Date and Time" is based on the "Communication Type", the "Conference ID", and the "Communication Date and Time" in the log data 503a.

The "Duration" represents duration time of the conference. The "Duration" is based on the above-mentioned "End Date and Time" and "Start Date and Time".

The conference data in the conference management table 503c is created by the edit part 502 which edits the received log data.

(Video Management Server)

The video management server 600 has a transceiver part 601 and a video management DB 602.

The transceiver part 601 may receive the video data transferred between communication terminals 100 via the communication management server 300 as well as the "Conference ID" of the video data. In response to a request from the configuration utility server 400, the transceiver part 601 may transmit the video data obtained from the video management DB 602 to the configuration utility server 400. The transceiver part 601 may receive the video data when the conference ends.

The video management DB 602 stores a video data management table 602a and the video data 602b transferred between the communication terminals 100 (discussed later).

(Video Data Management Table)

FIG. 9 is a table illustrating an example of the video data management table 602a. As shown in FIG. 9, the video data management table 602a stores the "Video Data" for each "Conference ID". For example, the "Video Data" represents file names of the data files which are associated with the actual video data.

(Configuration Utility Server)

The configuration utility server 400 has a transceiver part 401, a communication terminal ID acquisition part 402, an attendee history acquisition part 403, a video data acquisition part 404, and a play control part 405.

The transceiver part 401 may receive a request from the client PC 200 to show a configuration utility screen and may transmit data for the configuration utility screen. The transceiver part 401 may receive the attendee history data from the log management server 500 and the video data from the video management server 600.

The communication terminal ID acquisition part 402 may obtain from the client PC 200 the communication terminal ID which is a control target for the video data playback. For example, the communication terminal ID acquisition part 402 may obtain the communication terminal ID input through a login process via the configuration utility screen.

The attendee history acquisition part 403 may obtain the attendee history data of the communication terminal from the log management server 500 by using the communication terminal ID or date and time when the conference was held as a search key.

The video data acquisition part 404 may obtain the video data specified by a playback request (playback instruction) from the video management server 600.

When the client PC 200 issues the playback request for the video data, the play control part 405 controls the playback of the video data according to the attendee history data of the communication terminal 100 identified by the communication terminal ID. The playback control process is discussed later.

[An Example of Operation Screen for Video Data Playback]

FIG. 10 is a drawing illustrating an exemplary operation screen to play recorded videos. When the operation screen for the video data playback is displayed, the client PC 200 accesses the configuration utility server 400 and logs into the configuration utility server 400 using the communication terminal ID and a password. When the authentication is done successfully, the client PC 200 is able to play and view, via the operation screen 1000 as shown in FIG. 10, the recorded video data for the conference which had been held before.

The terminal ID 1001 represents an ID of the communication terminal ID. That indicates that a user using the communication terminal ID has logged into the configuration utility server 400.

A drop-down list 1002 is used to choose a month of the past conferences the user desires to play and view the recorded video data. For example, when the user chooses "September, 2010", the screen will show a list of the attendee history data 1003 for the conferences held in September, 2010.

The list of the attendee history data 1003 includes the items derived from the attendee history data obtained from the log management server 500 and the item "Conference Video" which may be obtained from the video management server 600.

In order to play the recorded video data, the user who is logged in may click a "Play" button 1004 under the "Conference Video" which the user desires to play.

However, in this embodiment, the user can only play a part of the recorded video of the conference that the user actually participated in. For example, for the conference having the conference ID "conf001", the user who is logged in with the communication terminal ID "110001" is allowed to play a part of the recorded video within the extent of the time from "2010-09-01 10:10:000" (Join Date and Time) to "2010-09-01 11:10:25" (Leave Date and Time). Thus, the user may play the part of the recorded video data from the time specified by "Join Date and Time" to the time "Leave Date and Time".

[Information Process]

(Video Data Playback Process)

Figure 11:
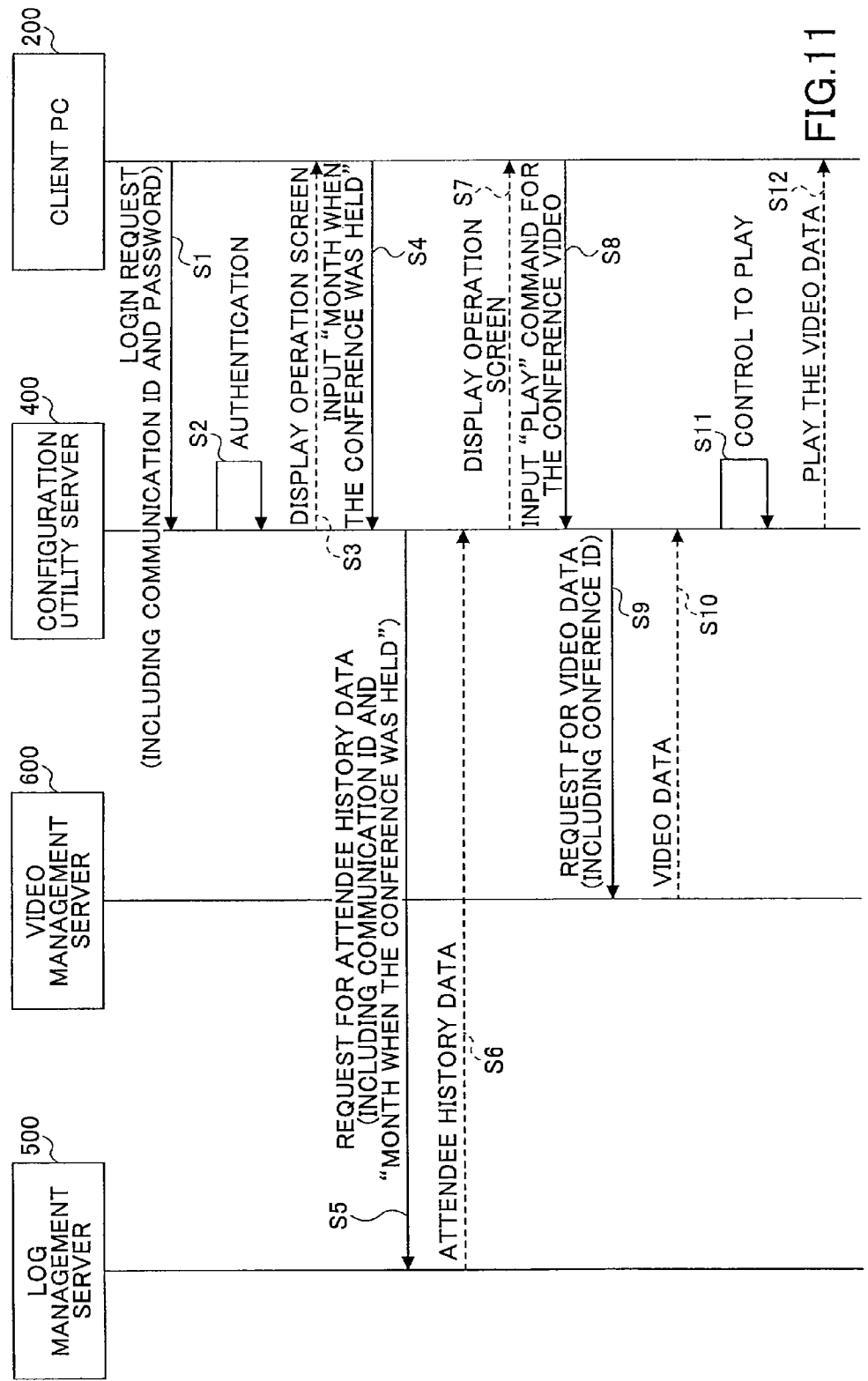
FIG. 11 is a sequence chart illustrating an exemplary process of playing the videos.

FIG. 11 is a sequence chart illustrating an exemplary process of playing the videos. Before a discussion of the process, it is assumed that the log management server 500 (the log management DB 503) has the attendee management table 503b and the conference management table 503c. In addition, the video management server 600 (the video management DB 602) has the video data management table 602a and the video data 602c transferred between the communication terminals 100.

S1: The client PC 200 sends a login request to the configuration utility server 400 and logs into the configuration utility server 400 using the communication terminal ID and the password.

S2: The configuration utility server 400 executes a login authentication for the communication terminal ID and password entered by the client PC 200. When the authentication is done successfully, the communication terminal ID acquisition part 402 obtains the communication terminal ID of the client PC 200 used for the authentication. Alternatively, any other ID may be used to login to the configuration utility server 400. In this case, the ID may be associated with the communication terminal ID in the end.

S3: When the authentication is done successfully, the transceiver part 401 of the configuration utility server 400 transmits operation screen data to the client PC 200 for displaying an operation screen (e.g. FIG. 10).

S4: The client PC 200 inputs information concerning the month when the conference was held to the configuration utility server 400. In particular, the user of the client PC 200 chooses the month of the conference the user desires to play from the drop-down list 1002 on the operation screen. With that operation, the conference he joined is queried in the attendee history data. From that operation, the configuration utility server 400 receives from the client PC 200 the information about the month when the conference was held (e.g. September, 2010, see FIG. 10).

S5: When the month is specified, the attendee history acquisition part 403 of the configuration utility server 400 transmits to the log management server 500 a request to obtain the attendee history data relating to conferences that the communication terminal joined in the specified period (month). Here, the attendee history acquisition part 403 specifies the communication terminal ID (e.g. "110001") and the month when the conference was held (e.g. "September, 2010") as parameters for the request of the attendee history data.

S6: When the transceiver part 501 of the log management server 500 receives the request for the attendee history data, the transceiver part 501 searches the attendee management table 503b and the conference management table 503c in the log management DB 503 using the parameters for the communication terminal ID and the month when the conference was held. After obtaining the search result, the transceiver part 501 responds to the request with the communication terminal ID (e.g. "110001") and the attendee history data for the conferences held in the month when the conference was held (e.g. "September, 2010").

The responded attendee history data may include the "Conference ID", the "Join Date and Time", the "Leave Date and Time", the "Hours of Participation", and the "Leave Status", which are obtained from the attendee management table 503b (See FIG. 7). Also, the attendee history data may include the "Start Date and Time" and the "End Date and Time", which are obtained from the conference management table 503c by searching it with a key "Conference ID" obtained from the attendee management table 503b (See FIG. 8).

S7: When the transceiver part 401 of the configuration utility server 400 receives the attendee history data, the transceiver part 401 transmits to the client PC 200 the operation screen data including the attendee history data for showing the operation screen (See FIG. 10).

S8: The client PC 200 input for the configuration utility server 400 issues a playback command for the conference video that the user desires to watch. In particular, the user of the client PC 200 chooses the "Play" button 1004 under the "Conference Video" on the list of the attendee history data 1003 for the conference that the user desires to watch. In this way, the client PC 200 inputs to the configuration utility server 400 the playback command.

S9: When the configuration utility server 400 receives the playback command from the client PC 200, the video data acquisition part 404 of the configuration utility server 400 sends a request for the video management server 600 to obtain the video data corresponding to the chosen conference. Here, the video data acquisition part 404 specifies the conference ID (e.g. "conf001") as a parameter for the request of the video data.

S10: When the transceiver part 601 of the video management server 600 receive the request for the video data, the transceiver part 601 searches the video data management table 602a in the video management DB 602 using the parameter. The transceiver part 601 returns the video data associated with the conference ID (e.g. "conf001") as a search result.

S11: When the play control part 405 of the configuration utility server 400 obtains the video data, the play control part 405 controls the playback of the video data (discussed later).

S12: The transceiver part 401 of the configuration utility server 400 transmits the video data for the extent that the user is allowed to view under control of the play control part 405. The client PC 200 is able to play the received video data for the extent of the time for which the communication terminal having the communication terminal ID "110001" had joined the conference.

The client PC 200 may play the video data either after receiving the whole data or while downloading it sequentially (i.e. streaming).

The video data transmitted to the client PC 200 may be encrypted. The encryption prevents other users who are sniffing the network 700 from watching the video.

(Playback Control Process)

When the play control part 405 of the configuration utility server 400 receives the video data, the play control part 405 executes the playback control for the video data (the above-mentioned S11). Thus, the play control part 405 determines the extent of the video data that the client PC 200 is allowed to play.

In the following discussion, the conference ID "conf001" shown in FIG. 10 is used for the purpose of illustration. When the user using the communication terminal ID "110001" plays the video data corresponding to the conference ID "conf001", the play control part 405 specifies the extent of time in the video data that the user may watch (i.e. specifies "Start Point" and "End Point" of the video data for the user).

In particular, the play control part 405 may compute the "Start Point" and the "End Point" with the following equation:

"Start Point"="Join Date and Time"−"Start Date and Time"; and

"End Point"="Leave Date and Time"−"Start Date and Time"

With reference to FIG. 10, the "Join Date and Time" of the communication terminal having the communication terminal ID "110001" is "September 1, 2010 at 10:10:10", and the "Start Date and Time" of the conference having for the conference ID "conf001" is "September 1, 2010 at 10:00:00". Therefore, the "Start Point" is "00:10:00".

On the other hand, the "Leave Date and Time" of the communication terminal having the communication terminal ID "110001" is "September 1, 2010 at 11:10:25", and the "Start Date and Time" of the conference having for the conference ID "conf001" is "September 1, 2010 at 10:00:00". Therefore, the "End Point" is "01:10:25".

As stated above, when the user using the communication terminal ID "110001" plays the video data of the conference having the conference ID "conf001", the play control part 405 allows the user to play only a part of the video data which is specified by the time from the "Start Point" "00:10:10" to the "End Point" "01:10:25".

Figure 12:
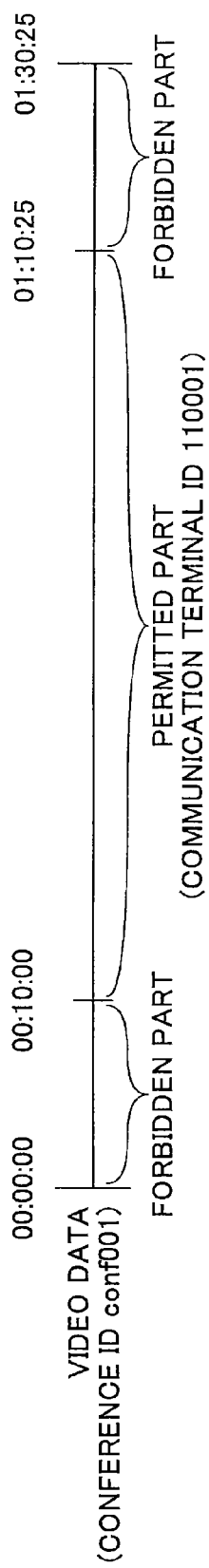
FIG. 12 is a drawing illustrating a process for controlling playback.

FIG. 12 is a drawing illustrating a process for controlling the playback.

For example, the conference having the conference ID "conf001" was held from 10:00:00 to 11:30:25 on Sep. 1, 2010 according to the "Start Date and Time" and the "End Date and Time" shown in FIG. 10. Thus, the recorded time of the video data corresponds to the time from "Start Date and Time" to the "End Date and Time" in the attendee history data. The video data of the conference having the conference ID "conf001" is 1 hour, 30 minutes, and 25 seconds long from the "Start Date and Time" to the "End Date and Time".

According to the "Join Date and Time" and the "Hours of Participation", the communication terminal 100 having the communication terminal ID "110001" had joined the conference from 10:10:00 to 11:10:25 on Sep. 1, 2010.

Thus, the play control part 405 allows the communication terminal 100 to play only the part of the video data for the conference that the communication terminal had actually joined.

Figure 13:
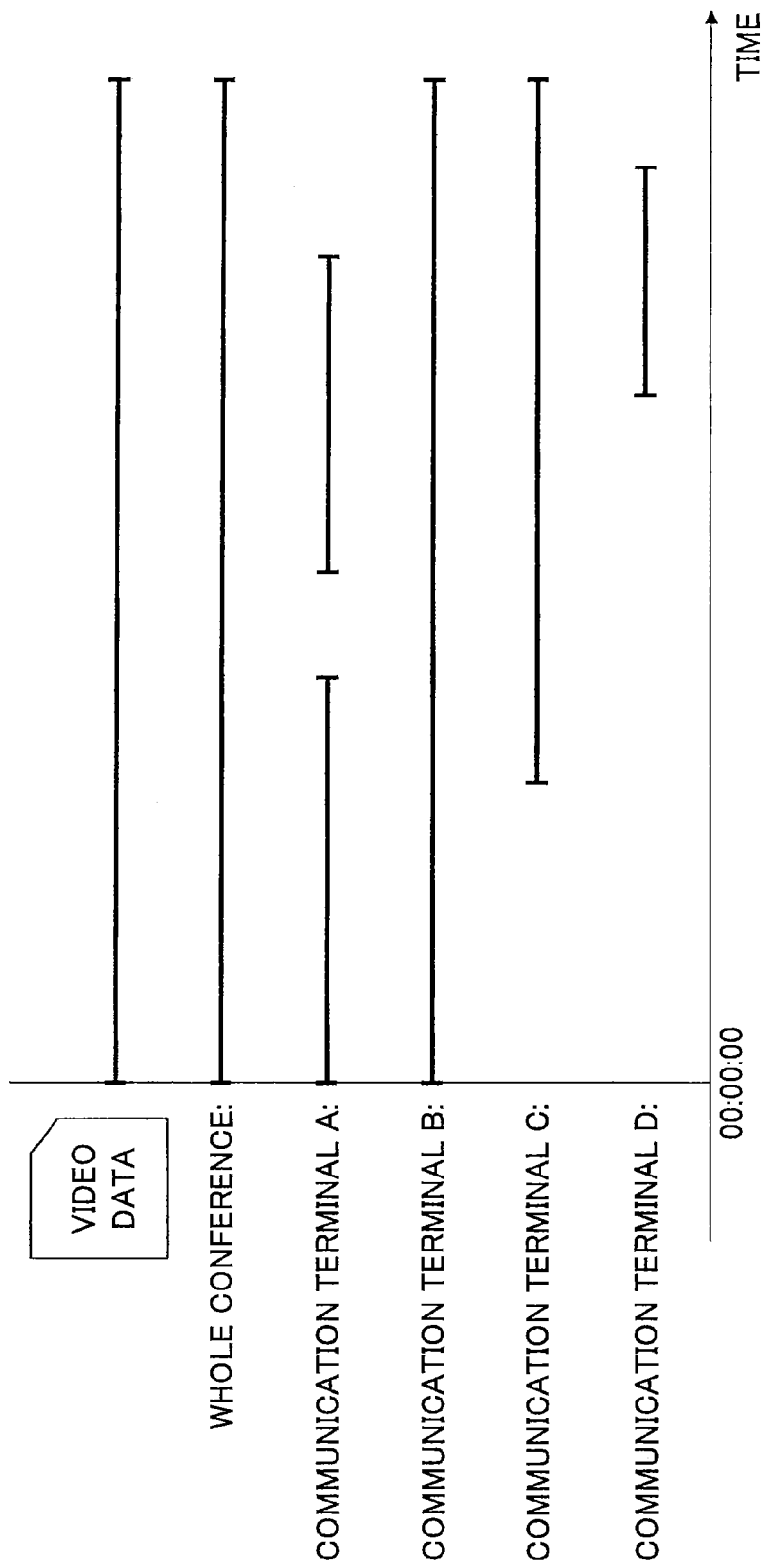
FIG. 13 is a drawing illustrating a process for controlling playback.

FIG. 13 is a drawing illustrating a process for controlling the playback. FIG. 13 is a schematic drawing illustrating a relationship among the video data, the entire time of the conference, and hours of participation for each communication terminal.

A duration of the video data corresponds to the time from "Start Date and Time" to the "End Date and Time" for the conference previously held. In this example, the communication terminals A-D independently join and leave this conference, and the "Join Date and Time" and the "Leave Date and Time" are recorded for the communication terminals. The play control part 405 does not allow the user using the communication terminal ID corresponding to each communication terminal to play the entire video data, but allows each user (or each client PC 200) to play the video data within the extent of time for which each communication terminal had joined.

According to this embodiment, the configuration utility server 400 may control the playback of the video data which is played on the Client PC. In particular, the configuration utility server 400 allows the client PC to play a part of the video data for the conference that the user (the communication terminal) had actually joined.

(Supplemental Explanation)

In the above-mentioned step S6, when the transceiver part 501 of the log management server 500 receives the request to obtain the attendee history data, the transceiver part 501 queries the attendee management table 503*b* and the conference management table 503*c* in the log management DB using the parameters: the communication terminal ID and the month when the conference was held. This search process is discussed further below.

First, when the transceiver part 501 of the log management server 500 receives the request to obtain the attendee history data, the transceiver part 501 calculates the "Search Start Date (from_date)" and "Search End Date (to_date)" based on the parameter of the month when the conference was held.

For example, if the month when the conference was held is "September, 2010", the "Search Start Date (from_date) is "2010-09-01 00:00:00" and the "Search End Date (to_date)" is "2010-10-01 00:00:00".

Next, the transceiver part 501 searches the attendee management table 503*b* in the log management DB 503 within the extent of time from the "Search Start Date (from_date)" to the "Search End Date (to_date)" using the communication terminal ID as a key, and the transceiver part 501 extracts the matched attendee history data. Next, the transceiver part 501 extracts the attendee history data from the conference management table 503*c* using the conference ID of the extracted data as a search condition, and merges the obtained results (items). The transceiver part 501 sends the attendee history data which is finally obtained after merging and forming, to the configuration utility server 400, which has transmitted the request.

In this embodiment, the history may be obtained when the period from "Join Date and Time" to "Leave Date and Time" extends to several months. For example, when the attendee history data (See FIG. 7) in which the communication terminal 100 joined on "2010-08-30" and left on "2010-10-01" exists, the attendee history data may be queried as history on August, September, and October. Thus, the search condition is an overlap period of the following: a period from "Join Date and Time" to "Leave Date and Time"; and a period from "Search Start Date (from_date) to "Search End Date (to_date) for the specified communication terminal ID.

Figure 14:
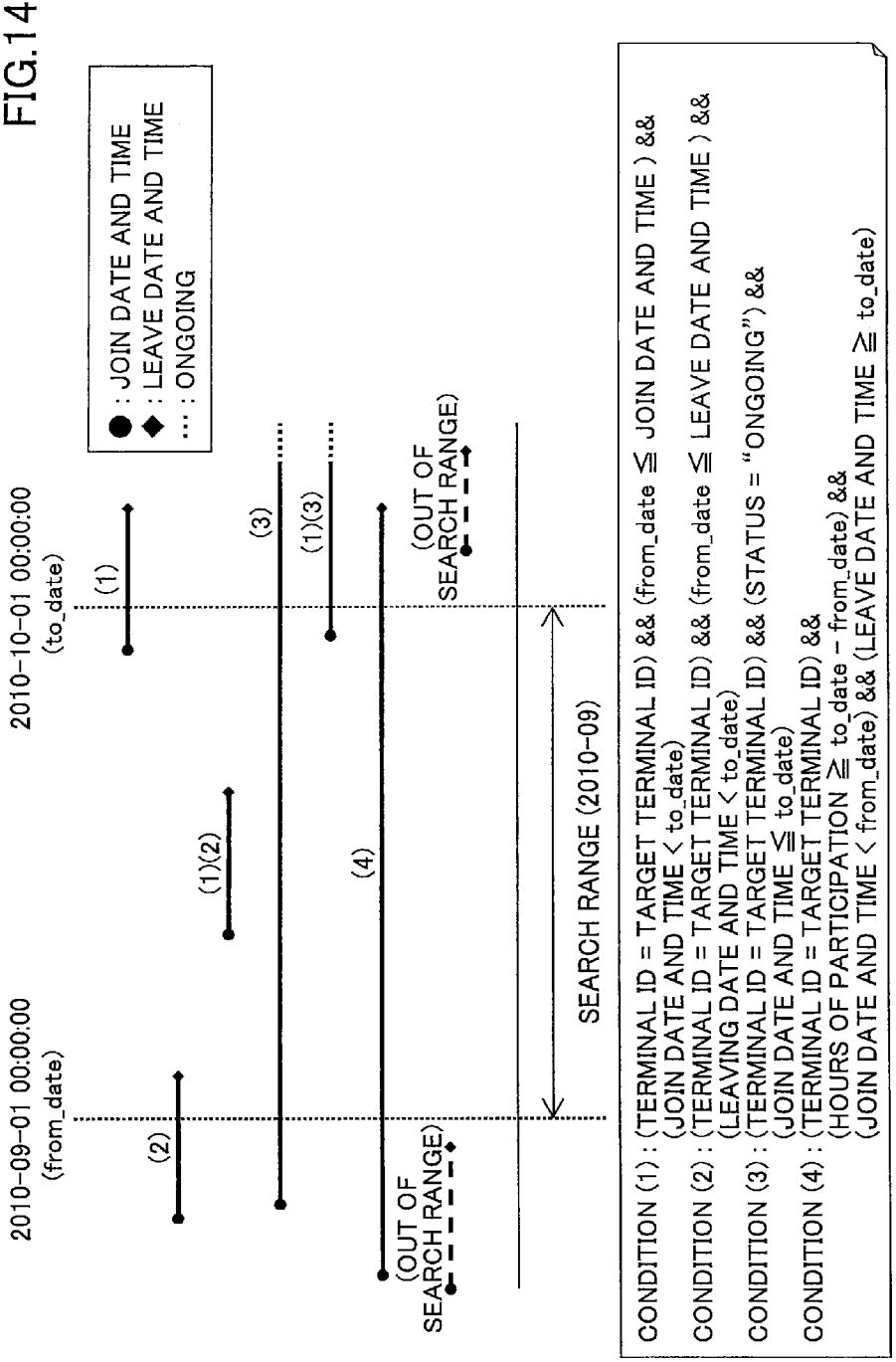
FIG. 14 is a drawing illustrating search conditions according to an embodiment of this invention.

FIG. 14 is a drawing illustrating search conditions according to this embodiment.

The search conditions may be broken down into four conditions (1)-(4). That makes it possible to limit a search scope for each condition. The conference history list may be extracted with a small search cost by taking an OR operation for the search conditions (1)-(4).

Condition (1)—the "Join Date and Time" falls within a search range as shown in FIG. 14

The search scope for the "Join Date and Time" may be limited to the month of the search range.

Condition (2)—the "Leave Date and Time" falls within a search range as shown in FIG. 14

The search scope for the "Leave Date and Time" may be limited to the month of the search range.

Condition (3)—the terminal has joined a conference before the month of the search range and the conference has not finished yet Only conferences in which their "Leave Status" are "Ongoing" may be searched. Unless the communication terminal has participated in conferences at the same time, only one history in which the "Leave Status" is "Ongoing" should exist.

Condition (4)—the period from the "Join Date and Time" to the "Leave Date and Time" extends for several months.

The search scope for the history may be limited by using a condition where the "Hours of Participation" is equal to or greater than "Search Start Date (from_date)" minus "Search End Date (to_date)". In the example shown in FIG. 14, the condition for the "Hours of Participation" is equal to or greater than one month.

[Variant 1]

FIG. 15 is a drawing illustrating an exemplary operation screen to play recorded video data. Compared to FIG. 10, an operation screen 1500 includes an additional item "Host Terminal ID". The "Host Terminal ID" 1501 may be obtained from the log management server 500 with other items based on the "Host Terminal ID" included in the conference management table (FIG. 8).

In this variant, when the user who is logged in to play the video data is the host, the configuration utility server 400 allows him to play the entire video data.

In particular, when the play control part 405 of the configuration utility server 400 controls playback of the video data, the play control part 405 compares the "Communication Terminal ID" 1502 with the "Host Terminal ID" 1501. If they are identical, the play control part 405 determines that the user is the host of the conference of the video data and allows him to play the entire video data.

Therefore, if the user hosting the conference cannot join it from beginning to end, he is allowed to play the entire video data and check the entire contents of the conference.

[Variant 2]

FIG. 16 is a table illustrating another example of the conference management table. Comparing to FIG. 8, the conference management table 503*c*-2 has an additional item "Private Code".

The "Private Code" is any alphanumeric string input by the host when he reserves or starts the conference. The "Private Code" is transmitted to the log management server 500 as data included in the communication log and stored in the conference management table 503*c*-2. The "Private Code" may be hashed (encrypted) when stored.

Figure 17:
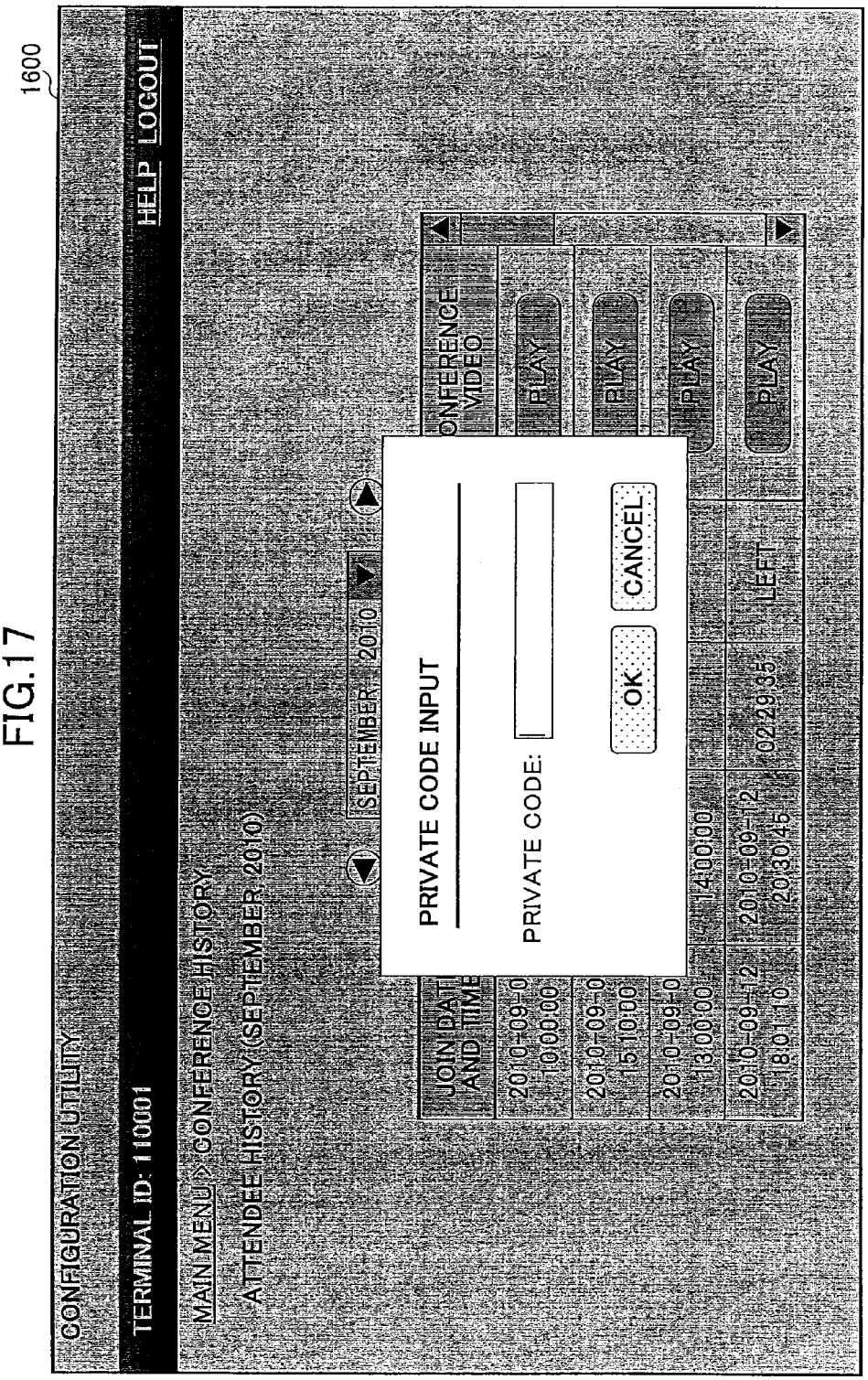
FIG. 17 is a drawing illustrating another exemplary operation screen to play recorded video data.

FIG. 17 is a drawing illustrating another exemplary operation screen to play recorded video data. Compared to FIG. 10, the operation screen 1600 requires the user to input the "Private Code" to play the video data.

In particular, the play control part 405 of the configuration utility server 400 allows the user to play the video after the play control part 405 compares the "Private Code" stored in the conference management table 503*c*-2 with the "Private Code" input by the user and determines they are identical. If the they are not identical, the play control part 405 does not allow the user to play the video data. The "Private Code" stored in the conference management table 503*c*-2 may be obtained by the log management server 500 (see S6 in FIG. 11).

By using the "Private Code" to determine whether the user may play the video data, the play control part 405 allows only the users (including the host) who know the "Private Code" to play the video data.

If the host logs in, the play control part 405 may allow him to play the video data without requiring the input of the "Private Code".

On the other hand, when the "Private Code" input by the user is identical to the "Private Code" in a record of the conference management table 503*c*-2, the play control part 405 may allow him to play the entire video data of the conference corresponding to the record. When the "Private Code" is not identical, the play control part 405 may allow him to play the part of the video data of the conference that the user had joined.

The screen may prompt the user to input the "Private Code" only for playback of the entire video data of the conference. For example, the screen may not display the dialog to input the "Private Code" when the "Play" button is pushed. Instead, the screen may have a text box to input the "Private Code" near the play button. If an incorrect "Private Code" is input, only the part of the video data of the conference that the communication terminal (user) had joined may be played.

[Overview]

In this embodiment, by associating the video data of the conference with the attendee history data for the communication terminals based on the communication log and executing the playback control, only the parts of the video data of the conference that the communication terminals had joined are allowed to be played. That enables each communication terminal to play only the part of the video data corresponding to the time for which each communication terminal had joined. As a result, more detailed control is achieved than conventional systems.

Thus, the playback control device, the playback control system, and a computer-readable storage medium which improve a playback control function for the video data transferred between the communication terminals may be provided.

This invention is not limited to a certain embodiment, and it will be obvious to those skilled in the art that various changes may be made without departing from the scope of the invention.

The above-mentioned embodiment refers to the communication system 1 handling the video data including still image data and sound data of the conference. However, this invention is applicable for a voice communication system transferring only voice data between communication terminals and an image transmission system transferring only image data between communication terminals. This invention is applicable for various kinds of systems depending on its usage and purpose.

In addition, the above-mentioned embodiment refers to the conference system as an example of a communication system for which this invention is applicable. However, this invention is also applicable for a telephone system (a cell-phone system), a video telephony system, a chat system or the like.

The purpose of the "conference" used in this embodiment is not limited to a business use. The "conference" includes any communication, such as a conversation or real-time messaging between family members or friends.

The present application is based upon and claims the benefit of priority of Japanese Patent Application No. 2013-048357 filed on Mar. 11, 2013, the entire contents of which are incorporated herein by reference.

PATENT DOCUMENT

[Patent Document 1] Japanese Laid-open Patent Publication No. 2012-156759

What is claimed is:

1. A communication system for controlling playback of data sent and received in communication between a plurality of communication terminals, the communication system comprising:

circuitry configured to
  acquire identification information identifying a communication terminal;
  acquire the data based on the identification information;
  acquire, based on the acquired identification information and a search start date and a search end date, conference participation history information including at least information of a join date and time when the communication terminal corresponding to the identification information joined a conference, a leave date and time when the communication terminal corresponding to the identification information left the conference, a month when the conference was held, and a conference ID;

acquire participant history information including at least information of a start date and time and an end date and time of the conference based on the conference ID; and control playback of the data only within a range of a time period when the communication terminal has participated in the conference, based on the conference participation history information and the participant history information of the communication terminal, wherein the conference participation history information is acquired even when a period between the join date and time and the leave date and time is greater than a search period between the search start date and the search end date.

2. The communication system as claimed in claim 1, wherein the circuitry determines a playback start point and a playback end point starting from the join date and time and ending at the leave date and time and plays the data.

3. The communication system as claimed in claim 2, wherein the circuitry further manages a code in association with the data, and the circuitry disallows playing of any portion of the data when the code associated with the data is not identical with a code input from a requesting communication terminal.

4. The communication system as claimed in claim 3, wherein when a host terminal identifier is identical with a requesting terminal identifier, the circuitry provides the data in its entirety regardless of whether the code associated with the data is identical with the code input from the requesting communication terminal.

5. The communication system as claimed in claim 2, wherein the circuitry further manages a code in association with the data, and when the code associated with the data is identical with a code input from a requesting communication terminal, the circuitry allows playing of the data in its entirety.

6. The communication system as claimed in claim 5, wherein the circuitry further allows playing of the data in its entirety when a requesting terminal identifier and a host identifier match, even though a host terminal does not enter the code.

7. The communication system as claimed in claim 1, further comprising a transmitter configured to encrypt the data and transmit the encrypted data to a requesting communication terminal for playing the data.

8. The communication system of claim 1, further comprising:
the plurality of communication terminals; and
a management device configured to manage a session in which the plurality of communication terminals join.

9. The communication system of claim 1, wherein the circuitry is further configured to
determine, from the conference ID and stored host identification data, a host terminal identifier of a host terminal of the conference;
determine whether a requesting terminal identifier of a requesting communication terminal and the determined host terminal identifier match;
when the requesting terminal identifier and the determined host terminal identifier do not match, provide the data from a determined playback start point to a determined playback end point to the requesting communication terminal in response to the request; and when the requesting terminal identifier and the determined host terminal identifier match, provide the data in its entirety from the start time to the end time regardless of the join data and time and the leave date and time of the requesting communication terminal.

10. The communication system of claim 9, wherein
the circuitry further manages a code in association with the data, and
the circuitry is further configured to, in response to receiving a request, when the requesting terminal identifier and the determined host terminal identifier do not match, and
when the code associated with the data is identical with a code input from the requesting communication terminal to request playing the data, the circuitry allows playing of the data in its entirety,
but when the code associated with the data is not identical with the code input from the requesting communication terminal, the circuitry provides data only from the determined playback start point to the determined playback end point.

11. The communication system of claim 1, wherein the circuitry is further configured to acquire the conference participation history information based on the search start date and the search end date, wherein the search period between the search start date and the search end date is one month.

12. A non-transitory computer-readable storage medium storing a program that, when executed by a computer causes the computer to control playback of data sent and received between a plurality of communication terminals by performing a method comprising:

acquiring identification information identifying a communication terminal;

acquiring the data based on the identification information;

acquiring, based on the acquired identification information and a search start date and a search end date, conference participation history information including at least information of a join date and time when the communication terminal corresponding to the identification information joined a conference, a leave date and time when the communication terminal corresponding to the identification information left the conference, a month when the conference was held, and a conference ID;

acquiring participant history information including at least information of a start date and time and an end date and time of the conference based on the conference ID; and controlling playback of the data only within a range of a time period when the communication terminal has participated in the conference, based on the conference participation history information and the participant history information of the communication terminal, wherein the conference participation history information is acquired even when a period between the join date and time and the leave date and time is greater than a search period between the search start date and the search end date.

* * * * *